United States Patent [19]

Jang

[11] Patent Number: 5,386,307

[45] Date of Patent: Jan. 31, 1995

[54] METHOD OF MANUFACTURING MULTI-LAYERED LIQUID CRYSTAL USING WELLS FOR COLUMNS AND DISSOLVABLE LAYERS BETWEEN LIQUID CRYSTAL LAYERS

[75] Inventor: In-sik Jang, Suwon, Rep. of Korea

[73] Assignee: Samsung Electronics Co., Ltd., Kyungki, Rep. of Korea

[21] Appl. No.: 169,283

[22] Filed: Dec. 20, 1993

[30] Foreign Application Priority Data

Dec. 26, 1992 [KR] Rep. of Korea ............... 1992-25632

[51] Int. Cl.$^6$ .................... G02F 1/133; G02F 1/1335; G02F 1/1333

[52] U.S. Cl. ........................................ 359/53; 359/62; 359/79

[58] Field of Search ....................... 359/53, 62, 79, 81, 359/51

[56] References Cited

U.S. PATENT DOCUMENTS

| | | | |
|---|---|---|---|
| 3,886,014 | 5/1975 | Bayer | 156/145 |
| 4,581,608 | 4/1986 | Aftergut et al. | 340/704 |
| 4,659,182 | 4/1987 | Aizawa | 350/339 F |
| 4,813,770 | 3/1989 | Clerc et al. | 350/347 E |
| 4,878,741 | 11/1989 | Fergason | 350/339 F |
| 5,113,272 | 5/1992 | Reamey | 359/53 |

*Primary Examiner*—Anita Pellman Gross
*Assistant Examiner*—Charles Miller
*Attorney, Agent, or Firm*—Robert A. Westerlund; Stephen r. Whitt; Charles R. Donohoe

[57] ABSTRACT

A method of manufacturing a multi-layered liquid crystal for a liquid crystal display device in which an electric-field effect type liquid crystal layer is placed between opposing upper and lower electrodes and a plurality of insulating layers are alternately stacked with the liquid crystal layer, includes the steps of forming a lower electrode on a substrate, alternately stacking an insulating layer and a source material layer having a selective dissolving characteristic for forming cavities for a liquid crystal layer, and performing a selective dissolution and liquid crystal injection through well-shaped holes. The method does not need an additional step of forming columns for supporting the liquid crystal layer, thereby achieving a cost reduction. The manufactured product has a much higher light dispersion effect.

7 Claims, 7 Drawing Sheets 10 10 10 10 1 2 6 3 7 7 7

10 10 10 10 1 2 6 3 7 7 7

METHOD OF MANUFACTURING MULTI-LAYERED LIQUID CRYSTAL USING WELLS FOR COLUMNS AND DISSOLVABLE LAYERS BETWEEN LIQUID CRYSTAL LAYERS

BACKGROUND OF THE INVENTION

The present invention relates to a method of manufacturing a multilayered liquid crystal for a liquid crystal display (LCD), and more particularly, to a method of forming a prop for supporting an insulating layer interposed between the unit liquid crystal layer and the insulating layer for separating unit liquid crystal layers.

Among currently utilized LCDs, an active matrix type LCD using a diode or thin film transistor (TFT) is a twisted nematic (TN) type or a super twisted nematic (STN) type, and as such, they require a polarized plate for controlling light. Such a polarized plate, however, intercepts at least 50% of the emitted light because tile plate transmits a light component which vibrates along the polarized axis. This lowers efficiency in light utility, and therefore dims the displayed image. For this reason, a background light source having considerable brightness is required to obtain an image of an appropriate brightness. A laptop wordprocessor or computer, which uses a dry cell battery or an accumulative battery cell as a power supply source, cannot be continuously operated for long periods due to the excessive power consumption of tile light source.

Also, in general LCDs which include TN and STN LCDs, since liquid crystal is charged between two glass plates, a cell gap which is a light-controlled area is necessary for being strictly adjusted to form a uniform picture. However, due to current technological limitations in the ultra-fine planarization of glass surface processing, the strict adjustment of the cell gap is very hard to achieve.

Taking such problems into consideration, tile polarized plate should not be used to enhance tile light utilizing efficiency, and instead, a single sheet of substrate should be used to reduce the burden of cell gap adjustment. LCDs have been proposed which do not employ the polarized plate. Examples of such an LCD without polarized plate include a cholesteric nematic transition (CNT) type which uses a phase transition effect and a dynamic scattering mode (DSM) type which was devised during early LCD development.

However, since tile DSM LCD exhibits slow response time and is thicker than other LCDs, it is no longer in common use.

Also, another example of an LCD which does not employ a polarized plate so as to increase light efficiency is a polymer-dispersed liquid crystal display (PDLCD). However, since the PDLCD is made of polymer material more than half of whose volume transmits light, tile light dispersion should occur uniformly so as to obtain a clear contrast ratio. There is a structural limitation in attaining these requirements in that the thickness of the liquid crystal layer should be at least 20 µm.

The disclosure of an LCD which adopts an electrical field effect type liquid crystal having a new structure in which the above conventional problems of the LCD are considerably improved, was filed as U.S. patent application Ser. No. 08/058,712 and as Japanese patent application No. hei 4-116146. A continuation-in-part application of tile above U.S. patent application has been filed and is related to the present application.

The above LCD has a first driving speed and a high light-utilization efficiency, in which the liquid crystal layer provided between the opposing electrodes is isolated by a plurality of insulation layers to form a multi-layer structure, the polarized plate is not used and only a single sheet of a glass substrate is applied.

In the manufacturing process of the liquid crystal display, however, holes for forming a column and holes for injecting liquid crystal should be separately formed. Further, since the dissolving of a layer consumes an excessive amount of time, neighboring portions are exposed and damaged by partial etching.

SUMMARY OF THE INVENTION

To overcome such problems, the object of tile present invention is to provide a method of manufacturing multi-layered liquid crystal for a liquid crystal display device, which does not require an additional step of forming columns and greatly enhances the light dispersion effect of liquid crystal.

To accomplish the object of the present invention, there is provided a method of manufacturing a multi-layered liquid crystal for a liquid crystal display device in which an electric-field effect type multi-layered liquid crystal is placed between opposing upper and lower electrodes, a plurality of insulating layers which divide the liquid crystal layer into several layers are alternately stacked with the liquid crystal layer, and columns for maintaining the distance between the electric insulating layers are provided therebetween, the method comprising the steps of: forming a dissolvable layer which provides a space for filling the liquid crystal and has wells for forming the columns; coating an insulating material on the dissolved layer, so as to form the columns of the insulating material filling the wells and an insulating layer which is integrated with the columns and formed on the dissolvable layer by a predetermined thickness: alternately and repeatedly performing the steps of forming the dissolvable layer and insulating layer so as to obtain a multi-layered stack made up of dissolvable layer/insulating layer: forming a multitude of liquid-crystal injecting wells of a predetermined diameter in the stack and removing the dissolvable layer through the liquid-crystal injecting wells so as to form cavities between the insulating layers: and injecting liquid crystal into the cavities through the liquid-crystal injecting wells so as to form a liquid crystal layer.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
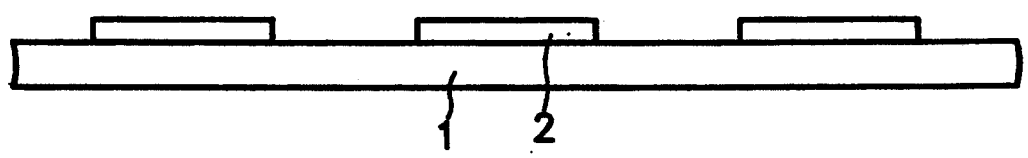
FIG. 1 is a cross-sectional view in which a lower electrode is formed on a substrate by a method for manufacturing multi-layered liquid crystal of an LCD of the present invention.

FIG. 1 shows a state in which a lower electrode 2 is formed on a transparent substrate 1 of glass or plastic. Lower electrode 2 is made by a general photolithography using ITO.

Figure 2:
FIG. 2 is a cross-sectional view in which a lower electrode-protecting layer of transparent organic resin is formed on the lower electrode by the method for manufacturing multi-layered liquid crystal of an LCD of the present invention.

FIG. 2 illustrates a state in which a lower electrode protecting layer 3 of transparent organic resin, which is not dissolved by a particular solvent, is coated on the overall surface of substrate 1 and lower electrode 2 is located under lower electrode protecting layer 3. Lower electrode protecting layer 3 of transparent organic resin is obtained by coating epoxy or acryl resin having an excellent electric insulation characteristic according to a spin coating method or roll coating method.

Figure 3:
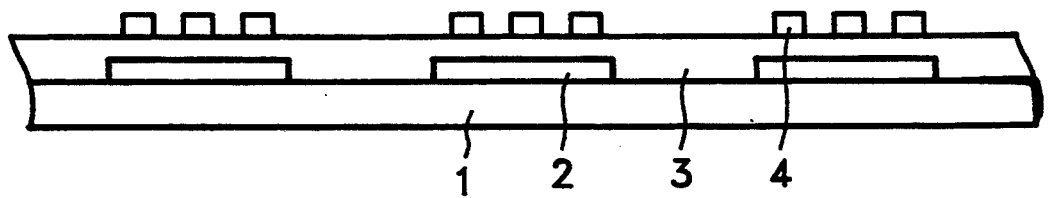
FIG. 3 is a cross-sectional view in which a mask for a dissolved layer is formed prior to the dissolvable layer by the method for manufacturing multilayered liquid crystal of an LCD of the present invention.

In FIG. 3, a cylindrical first mask 4 is formed on lower-electrode protecting layer 3 in a predetermined pattern.

Figure 4:
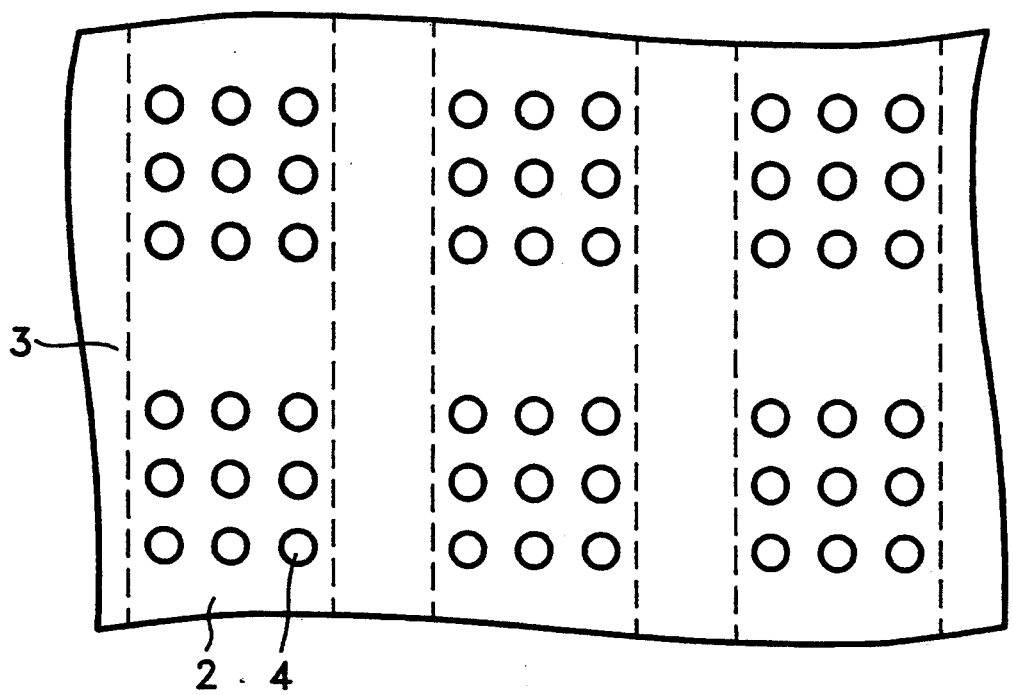
FIG. 4 is a plan view in which a mask for a dissolvable layer is formed prior to tile forming of the dissolvable layer by tile method for manufacturing multi-layered liquid crystal of an LCD of the present invention.

FIG. 4 is a plan view showing the arrangement of first mask 4 on lower electrode protecting layer 3. First mask 4 is formed by the roll coating method or screen printing method.

Figure 5:
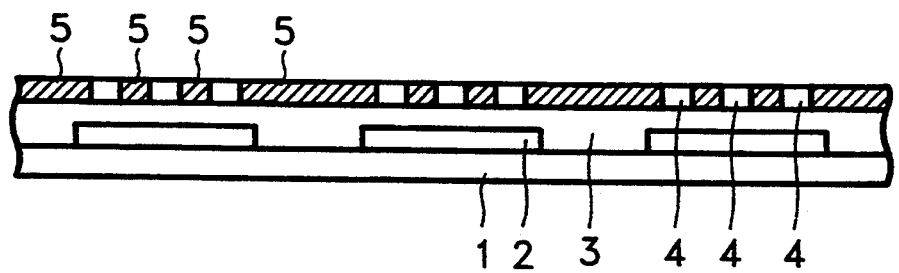
FIG. 5 is a cross-sectional view in which the dissolvable layer is formed the mask by the method for manufacturing multi-layered liquid crystal of an LCD of tile present invention.

FIG. 5 shows a state in which a dissolvable layer 5, which is dissolved by a specific solvent, is formed in the portions in which first mask 4 is not formed. The dissolvable layer may be made of organic resin of poly vinyl alcohol (PVA) or poly vinyl butyral (PVB).

Figure 6:
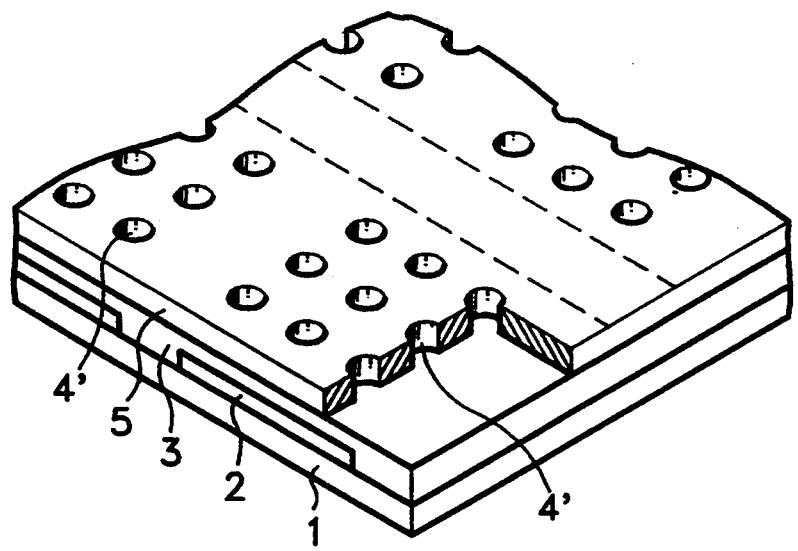
FIG. 6 is a perspective view in which the mask is removed to form the dissolvable layer having wells by the method for manufacturing multi-layered liquid crystal of an LCD of the present invention.

FIG. 6 is a perspective view in which first mask 4 is removed and a multitude of wells 4' are formed in dissolvable layer 5. Dissolved layer 5 having such wells 4' may be formed directly on lower electrode protecting layer 3 shown in FIG. 2 (not through the process illustrated in FIGS. 3, 4 and 5). Dissolvable layer 5 is made by the roll coating method or screen printing method having a predetermined pattern. These methods directly form dissolvable layer 5 having wells 4'.

Figure 7:
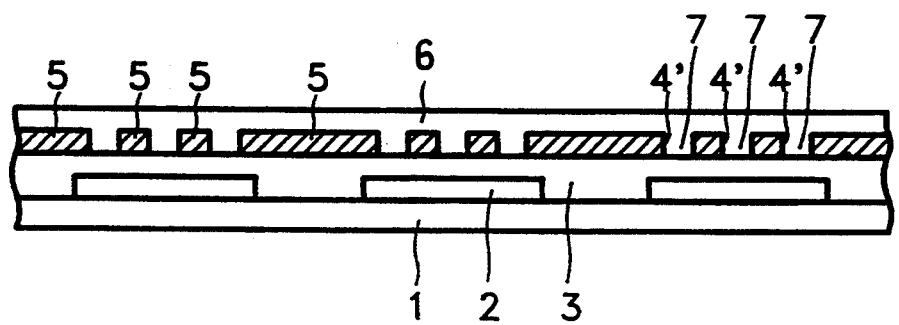
FIG. 7 is a cross-sectional view in which an insulating layer is formed on the dissolvable layer by the method for manufacturing multi-layered liquid crystal of an LCD of tile present invention.

Referring to FIG. 7, an insulating layer 6 of organic resin is formed on dissolvable layer 5 by a predetermined thickness, and the organic resin fills wells 4' so as to provide columns 7. Insulating layer 6 and columns 7 are integrated and made of the same material. They can be formed of an epoxy or acryl having excellent electrical insulation properties, like electrode protecting layer 3.

Figure 8:
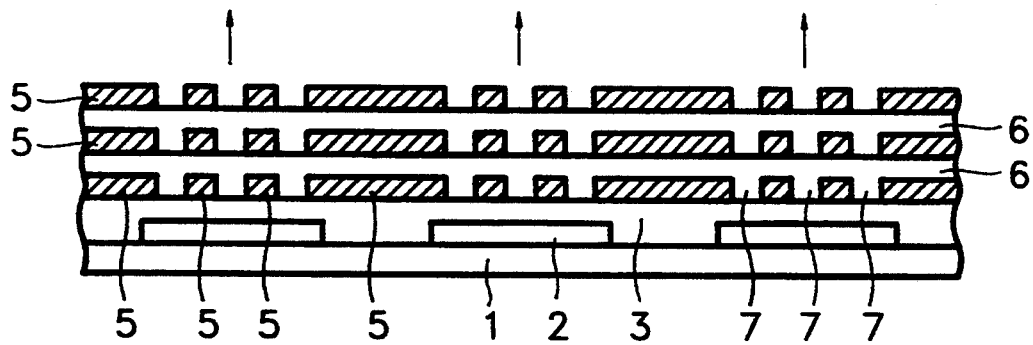
FIG. 8 is a cross-sectional view in which tile dissolvable layer and insulating layer are stacked in a multi-layer structure by the method for manufacturing multi-layered liquid crystal of an LCD of the present invention.

FIG. 8 is a cross-sectional view in which dissolvable layer 5 and insulating layer 6 are alternately stacked in a multi-layered structure by repeatedly performing the process shown in FIGS. 3-7 several times. Dissolvable layer 5 and insulating layer 6 are formed according to the aforementioned process. The number of their respective stacked layers is five to ten layers.

Figure 9:
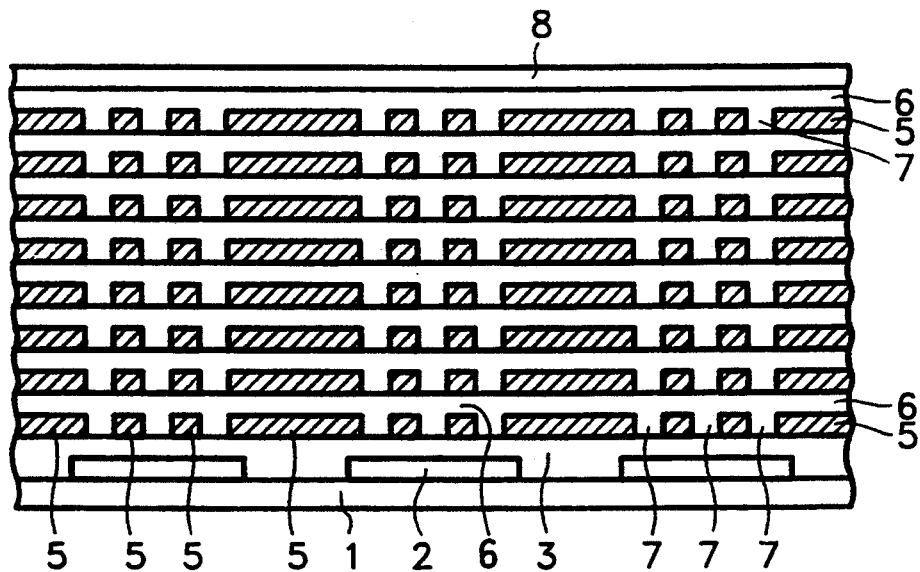
FIG. 9 is a cross-sectional view in which an upper electrode is formed the stack obtained through the process of FIGS. 1-8 by the method for manufacturing multi-layered liquid crystal of an LCD of the present invention.

In FIG. 9, an ITO transparent upper electrode 8 corresponding to lower electrode 2 is formed on the stack obtained through the above process. Upper electrode 8 is formed perpendicular to lower electrode 2 to constitute an X-Y matrix.

Figure 10:
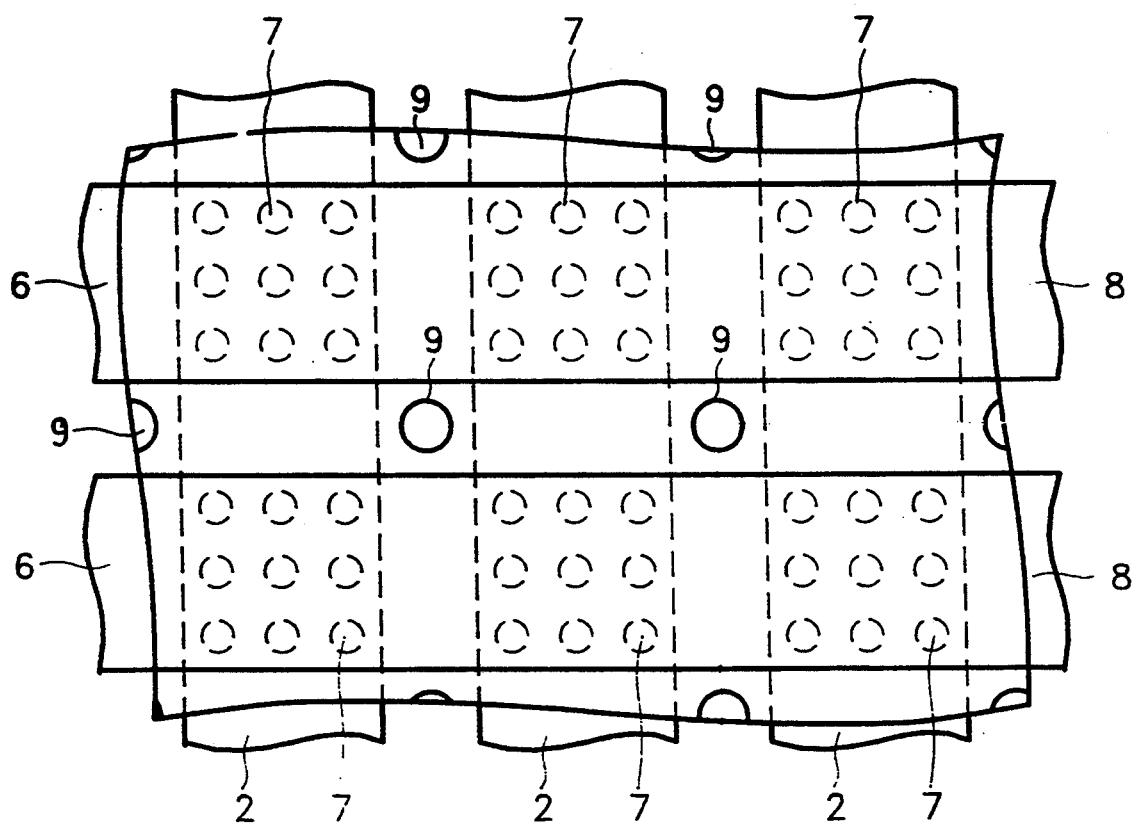
FIG. 10 is a plan view in which liquid-crystal injecting wells are formed in a stack by the method for manufacturing multi-layered liquid crystal of an LCD of tile present invention.

Referring to FIG. 10, upper electrode 8 is formed, and then liquid-crystal injecting wells 9 are formed therein by a predetermined depth. Liquid-crystal injecting wells 9 are placed in portions other than where the crossed upper and lower electrodes exist.

Figure 11:
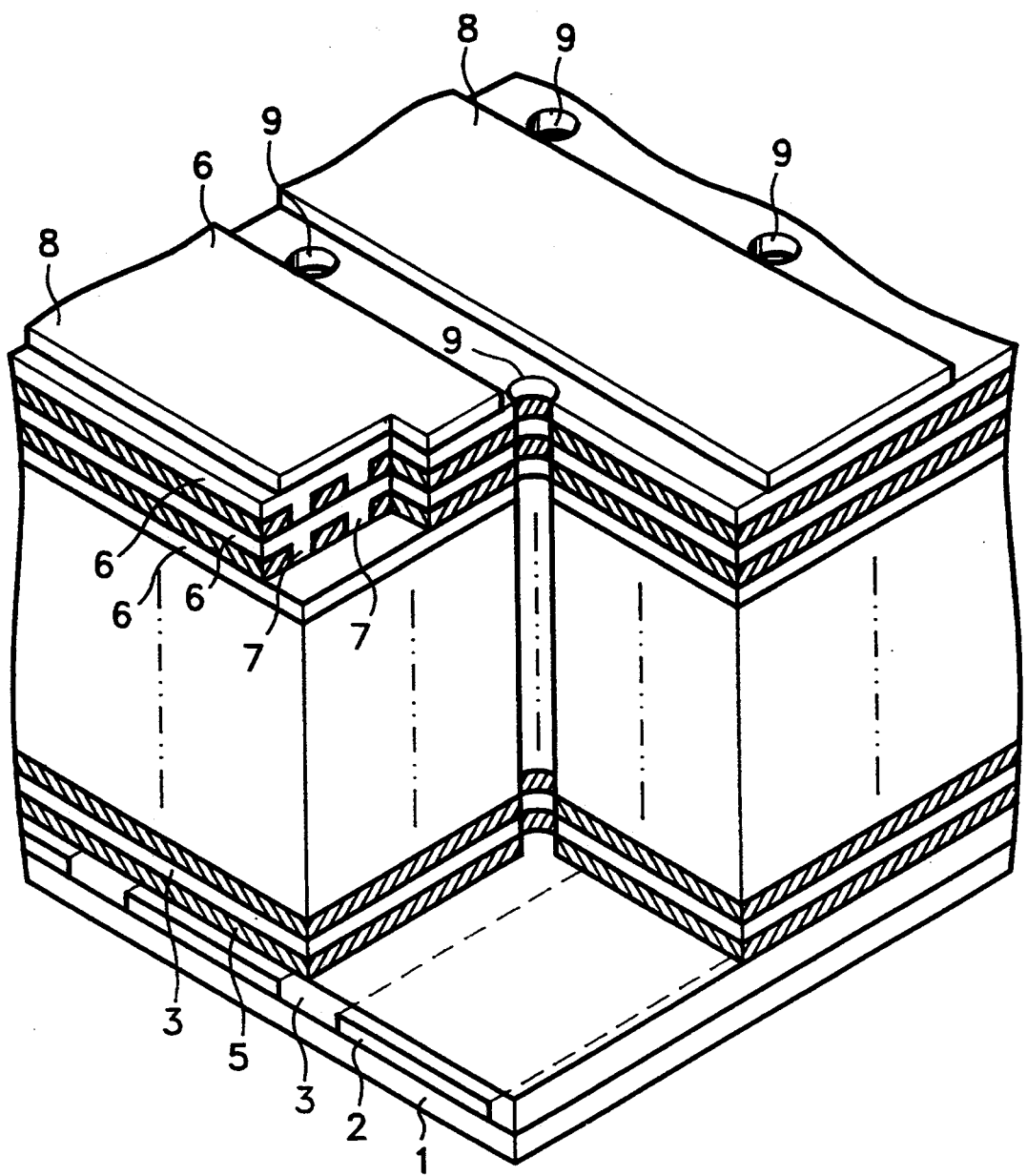
FIG. 11 is a cutaway perspective view in which the liquid-crystal injecting wells are formed by the method for manufacturing multi-layered liquid crystal of an LCD of the present invention.

FIG. 11 is a partially cutaway perspective view of a stack containing liquid-crystal injecting wells 9 shown in FIG. 10. Liquid-crystal injecting wells 9 can be made by a reactive ion etching, and extend to electrode-protecting layer 2, perpendicular to the stack.

Figure 12:
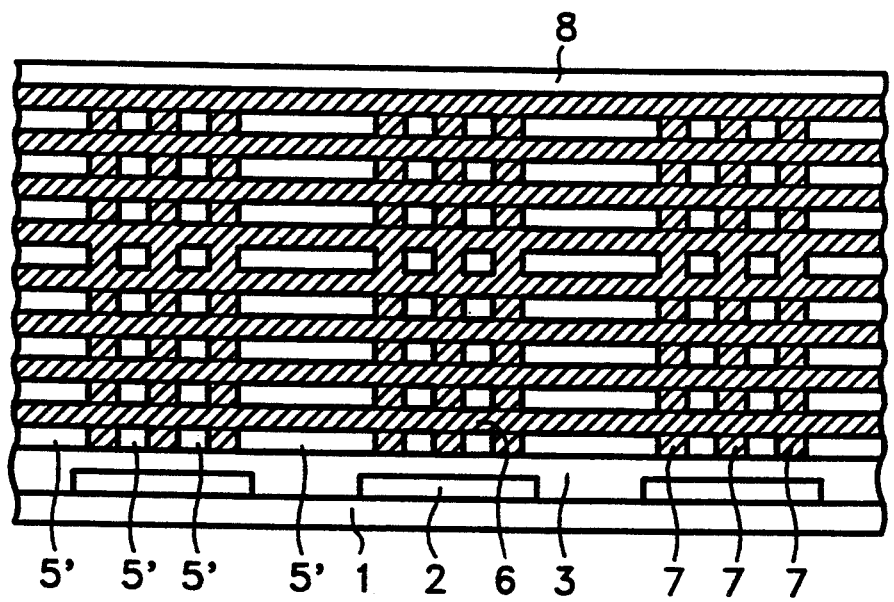
FIG. 12 is a cross-sectional view in which the dissolvable layer is removed to form cavities for a liquid crystal layer by the method for manufacturing multi-layered liquid crystal of an LCD of tile present invention.

In FIG. 12, dissolvable layer 5 interposed between insulating layer 3 is removed by supplying a solvent through liquid-crystal injecting well 9, so as form cavities 5'. The solvent can be made by mixing acetone, toluene, water or the like at an appropriate rate.

Figure 13:
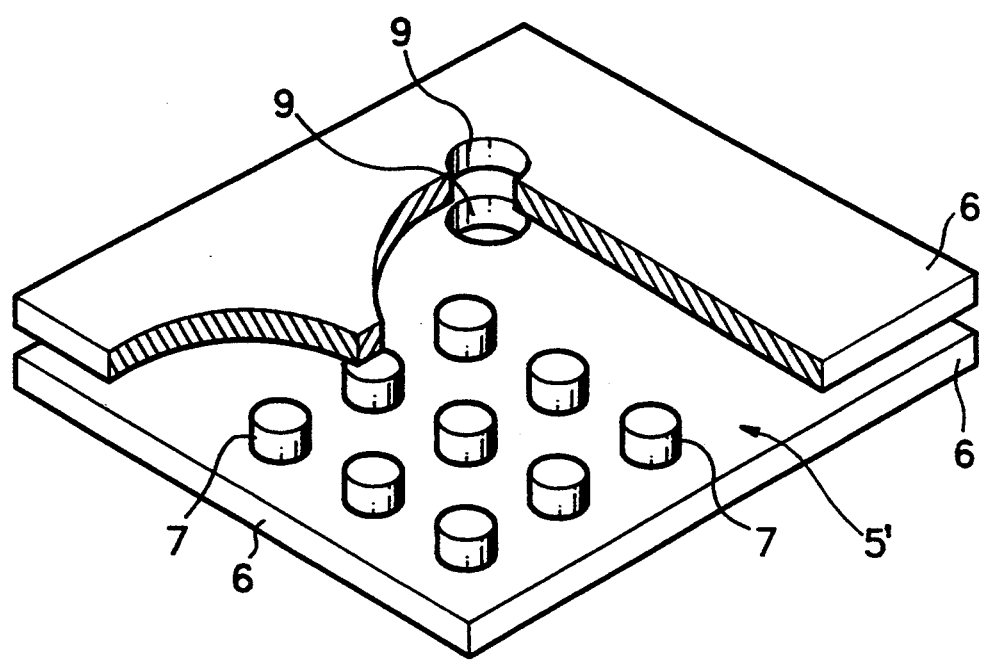
FIG. 13 is a partially extracted and cutaway view of the structure of the cavities by the method for manufacturing multi-layered liquid crystal of an LCD of the present invention.

FIG. 13 three-dimensionally shows the relation of cavities 5' obtained through the process of FIG. 12, insulating layers 6 provided above and below the cavities, and columns 7 for maintaining the distance of insulating layers 6.

Here, when liquid crystal fills the cavities and power is applied to the upper and lower electrodes so as to activate the liquid crystal, part of the liquid crystal is arranged along the circumference of columns 7. This doubles the light scattering effect as compared with when the liquid crystal is consistently arranged, that is, vertically or horizontally.

Figure 14:
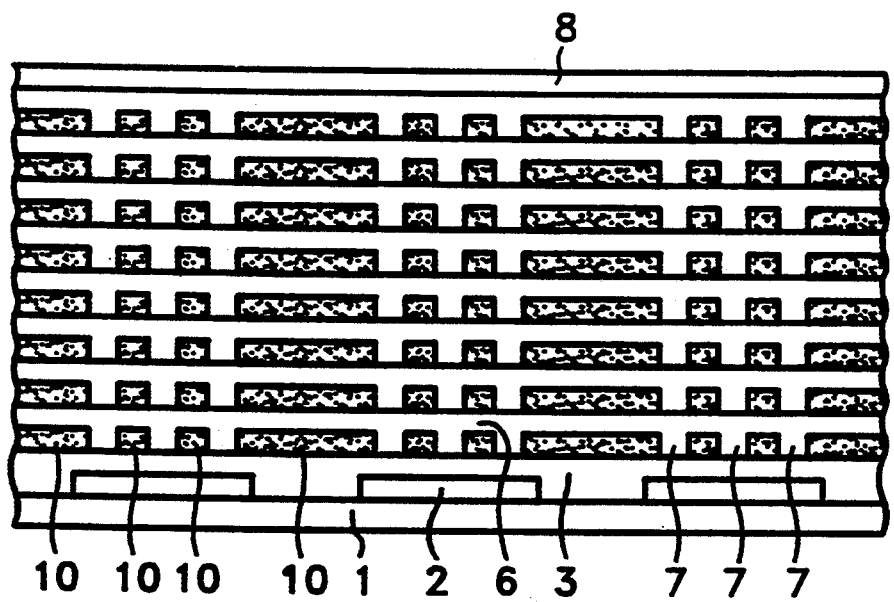
FIG. 14 is a cross-sectional view in which liquid crystal is injected into the cavities to form the liquid crystal layer by the method for manufacturing multi-layered liquid crystal of an LCD of the present invention.

In FIG. 14, liquid crystal is injected into the cavities through liquid-crystal injecting wells 9 so as to form a liquid crystal layer 10. After the dissolvable layer is removed and prior to the liquid crystal injection, the dregs the organic material remaining in the cavities are preferably removed by water.

Figure 15:
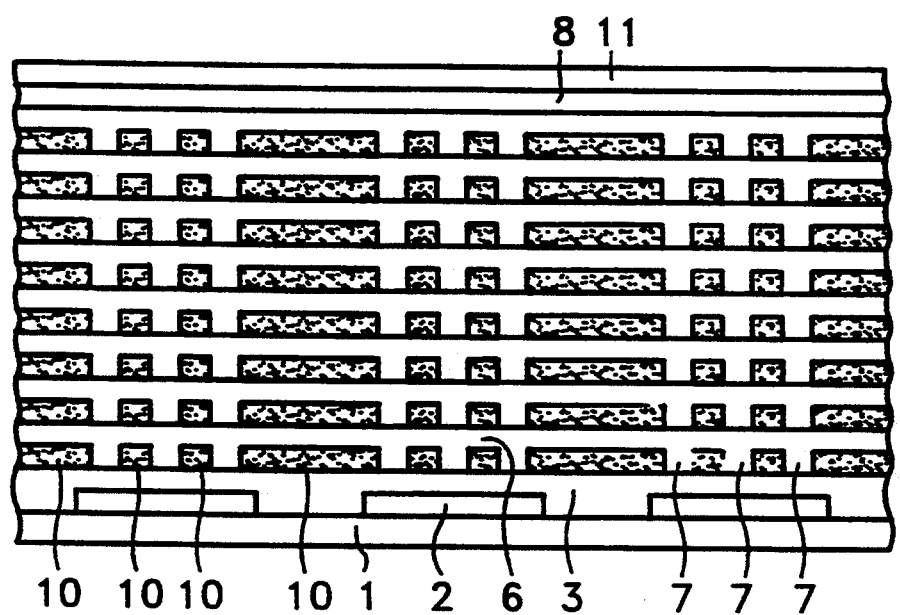
FIG. 15 is a cross-sectional view in which an upper-electrode protecting layer for sealing the liquid-crystal injecting wells and protecting the upper electrode is formed by the method for manufacturing multi-layered liquid crystal of an LCD of the present invention.

Referring to FIG. 15, an upper-electrode protecting layer 11 of acryl resin is formed so as to protect upper electrode 6. Upper-electrode protecting layer 11 protects the electrode and seals liquid-crystal injecting wells 9.

The present invention described above is characterized in the method of manufacturing the columns for supporting the insulating layers. In this method, the insulating layers and columns are integrated. For this purpose, the wells for forming the columns are provided in the dissolvable layer temporarily formed during the manufacturing process so that part of the material of the insulating layers fills the wells when the insulating layers are stacked on the dissolvable layer. In the manufacturing method of the present () invention as described above, the dissolvable layer containing the wells may be formed by photolithography having a process of formation of an exposure-selective etching of the source layer pattern. It is desirable that the dissolvable layer is formed by the roll coating method or screen printing method using a previously made pattern.

In the method of manufacturing a liquid crystal display device of the present invention described above, since the insulating layers which divide the liquid crystal layer into several layers are formed as one body with the columns located therebetween, separation of the insulating layer and columns and the problems created due to the separation are prevented. Especially, since the columns are located in the areas where the upper and lower electrodes cross, that is, inside pixels, the liquid crystal is effectively controlled to thereby realize a clear and high-contrast picture. The method of manufacturing a liquid crystal display device of the present invention does not need an additional step of forming columns for supporting the liquid crystal layer, thereby simplifying the manufacturing process. Further, the present invention can manufacture products having a much higher light dispersion effect. This achieves a reduction in cost and enhances the competitiveness of manufactured products.

What is claimed is:

1. A method of manufacturing a multi-layered liquid crystal for a liquid crystal display device in which an electric-field effect type liquid crystal layer is placed between opposing upper and lower electrodes, a plurality of insulating layers which divide said liquid crystal layer into a plurality of layers are alternately stacked with said liquid crystal layer, and columns for maintaining the distance between said electric insulating layers are provided therebetween, said method comprising the steps of:
    forming a dissolvable layer which provides a space for filling said liquid crystal and has wells for forming said columns;
    coating an insulating material on said dissolvable layer, so as to form said columns of said insulating material filling said wells and an insulating layer which is integrated with said columns and formed on said dissolvable layer by a predetermined thickness;
    alternatively and repeatedly performing said steps of forming said dissolvable layer and insulating layer so as to obtain a multi-layered stack made up of a dissolvable layer/insulating layer;
    forming a multitude of liquid-crystal injecting wells of a predetermined diameter in said stack and removing said dissolvable layer through said liquid-crystal injecting wells so as to form cavities between said insulating layers; and
    injecting liquid crystal into said cavities through said liquid-crystal injecting wells so as to form a liquid crystal layer.

2. A method of manufacturing a multi-layered liquid crystal for a liquid crystal display device as claimed in claim 1, wherein said dissolvable layer is formed by one of photolithography, spin coating and roll coating.

3. A method of manufacturing a multi-layered liquid crystal for a liquid crystal display device as claimed in claim 2, wherein said insulating layers and/or liquid crystal layers are stacked in five to ten layers.

4. A method of manufacturing a multi-layered liquid crystal for a liquid crystal display device as claimed in claim 3, wherein said insulating layer is made of epoxy or acryl resin.

5. A method of manufacturing a multi-layered liquid crystal for a liquid crystal display device as claimed in claim 1, wherein said insulating layers and/or liquid crystal layers are stacked in five to ten layers.

6. A method of manufacturing a multi-layered liquid crystal for a liquid crystal display device as claimed in claim 5, wherein said insulating layer is made of epoxy or acryl resin.

7. A method of manufacturing a multi-layered liquid crystal for a liquid crystal display device as claimed in claim 1, wherein said insulating layer is made of epoxy or acryl resin.

* * * * *